United States Patent
Park et al.

(10) Patent No.: US 12,269,922 B2
(45) Date of Patent: Apr. 8, 2025

(54) METHOD FOR PREPARING ARAMID NANOFIBER DISPERSION

(71) Applicant: KOREA RESEARCH INSTITUTE OF CHEMICAL TECHNOLOGY, Daejeon (KR)

(72) Inventors: Jeyoung Park, Ulsan (KR); Dong Yeop Oh, Busan (KR); Sung Yeon Hwang, Seoul (KR); Hyun Gil Cha, Ulsan (KR); Jong Geon Jegal, Ulsan (KR); Ho Jun Kim, Ulsan (KR); Seul A Park, Ulsan (KR)

(73) Assignee: KOREA RESEARCH INSTITUTE OF CHEMICAL TECHNOLOGY, Daejeon (KR)

( * ) Notice: Subject to any disclaimer, the term of this patent is extended or adjusted under 35 U.S.C. 154(b) by 974 days.

(21) Appl. No.: 17/056,981

(22) PCT Filed: Mar. 19, 2019

(86) PCT No.: PCT/KR2019/003169
§ 371 (c)(1),
(2) Date: Nov. 19, 2020

(87) PCT Pub. No.: WO2019/225848
PCT Pub. Date: Nov. 28, 2019

(65) Prior Publication Data
US 2021/0238348 A1 Aug. 5, 2021

(30) Foreign Application Priority Data

May 21, 2018 (KR) .......................... 10-2018-0057585

(51) Int. Cl.
| | | |
|---|---|---|
| *C08G 69/32* | (2006.01) | |
| *B01D 39/16* | (2006.01) | |
| *C08J 3/11* | (2006.01) | |
| *D01D 1/02* | (2006.01) | |
| *D01F 1/10* | (2006.01) | |
| *D01F 6/60* | (2006.01) | |

(52) U.S. Cl.
CPC ......... *C08G 69/32* (2013.01); *B01D 39/1623* (2013.01); *C08J 3/11* (2013.01); *D01D 1/02* (2013.01); *D01F 1/10* (2013.01); *D01F 6/605* (2013.01); *B01D 2239/025* (2013.01); *B01D 2239/0618* (2013.01); *B01D 2239/10* (2013.01); *B01D 2239/1233* (2013.01); *C08J 2377/10* (2013.01); *D10B 2505/04* (2013.01)

(58) Field of Classification Search
CPC ...... B01D 2239/025; B01D 2239/0435; B01D 2239/0618; B01D 2239/0654; B01D 2239/086; B01D 2239/10; B01D 2239/1225; B01D 2239/1233; B01D 39/1623; B01D 39/163; B01D 71/56; C08G 69/265; C08G 69/32; C08J 2377/10; C08J 3/11; D01D 1/02; D01D 5/40; D01F 1/10; D01F 6/605
See application file for complete search history.

(56) References Cited

U.S. PATENT DOCUMENTS

| | | | | |
|---|---|---|---|---|
| 5,028,372 A | * | 7/1991 | Brierre | D01F 6/605 264/180 |
| 2006/0155011 A1 | * | 7/2006 | Frances | H01B 1/24 523/220 |
| 2013/0288050 A1 | * | 10/2013 | Arruda | B32B 5/22 428/401 |

FOREIGN PATENT DOCUMENTS

| | | | |
|---|---|---|---|
| CN | 103537198 | * | 1/2014 |
| JP | 2016120490 A | | 7/2016 |
| KR | 10-1994-0000285 B1 | | 1/1994 |
| KR | 94000285 B1 | * | 1/1994 |
| KR | 10-2000-0058030 A | | 9/2000 |
| KR | 10-2009-0127337 A | | 12/2009 |
| KR | 10-2011-0132070 A | | 12/2011 |

OTHER PUBLICATIONS

Qingxia Kuang et al "Toward Record-High Stiffness in Polyurethane Nanocomposites Using Aramid Nanofibers", J. Phys. Chem. C 2015, 119, 27467-27477 (Year: 2015).*
Ming Yang et al "Dispersions of Aramid Nanofibers: A New Nanoscale Building Block", ASC NANO, vol. 5, No. 9, pp. 6945-6954. (Year: 2011).*
J. Liu et al "Morphology and crystal structure in single crystals of poly(p-phenylene terephthalamide) prepared by melt polymerization", Polymer vol. 37 No. 8, pp. 1413-1430, 1996 (Year: 1996).*
Jinglong Li et al "Preparation and performance of aramid nanofiber membrane for separator of lithium ion battery", J.Appl. Polymer Science, 2015 (Year: 2015).*
Yan et al "A new approach to the preparation of poly(p-phenylene terephthalamide) nanofibers", RSC Adv., 2016, 6, 26599 (Year: 2016).*

(Continued)

*Primary Examiner* — Frances Tischler
*Assistant Examiner* — Gennadiy Mesh
(74) *Attorney, Agent, or Firm* — Harness, Dickey & Pierce, P.L.C.

(57) ABSTRACT

A method for preparing an aramid nanofiber dispersion includes dissolving an aromatic polyamide-based polymer in a solution including a basic material and an aprotic polar solvent, while performing stirring so that a nanofiber is produced, wherein the aromatic polyamide-based polymer is a polymer in a form of a solid which is not spun into a fiber form, the stirring is performed at a temperature of 50° C. or lower and at a speed of 10-1000 rpm so that a time taken for the aromatic polyamide-based polymer to be dissolved and formed into an aramid nano-fiber dispersion is 80 hours or less, an aramid nanofiber in the aramid nanofiber dispersion has an average diameter of 1 to 100 nm and an average length of 0.1 to 100 μm, and the basic material includes potassium hydroxide or sodium hydroxide.

4 Claims, 5 Drawing Sheets

(56) References Cited

OTHER PUBLICATIONS

Wenting Tian et al "The facile preparation of aramid insulation paper from the bottom-up nanofiber synthesis", Materials Letters 202 (2017) 158-161 (Year: 2017).*
International Search Report for International Application No. PCT/KR2019/003169 dated Jul. 22, 2019.
K. Cao et al., "Kevlar-Based Nanocomposites with Hierarchical Structure" ECCM15—15th European Conference on Composite Materials, Venice, Italy, Jun. 24-28, 2012.

* cited by examiner

METHOD FOR PREPARING ARAMID NANOFIBER DISPERSION

CROSS-REFERENCE TO RELATED APPLICATIONS

This application is a national phase under 35 U.S.C. § 371 of PCT International Application No. PCT/KR2018/003169 which has an International filing date of Mar. 19, 2019, which claims priority to Korean Application No. 10-2018-0057585, filed May 21, 2018, the entire contents of each of which are hereby incorporated by reference.

TECHNICAL FIELD

The present invention relates to a method for preparing an aramid nanofiber dispersion. More specifically, the present invention relates to a method for preparing an aramid nanofiber in a short time from an aromatic polyamide-based polymer other than a fiber, and an aramid nanofiber prepared therefrom.

BACKGROUND ART

An aramid nanofiber not only has superior mechanical strength of the nanofiber itself but also increases the mechanical strength of existing polymers as a nano-composite when used with a matrix in combination, and thus, is spotlighted as a new material.

As a kind of aramid, Kevlar is an artificial fiber developed by DuPont, U.S., and the trial product was released in 1971. Kevlar is an aromatic polyamide fiber in which a phenyl group is bonded to all main chains except an amide group in a para form. Kevlar is a high strength fiber which is liquid crystal-spun in a sulfuric acid solution and is known to have excellent physical properties such as strength, elasticity, and vibration absorption force.

Usually, aramid is prepared by dissolving an aromatic diamine in a polymerization solution to prepare a mixed solution, adding an aromatic diacid to the prepared mixed solution, and performing polymerization. However, since an aramid polymer conventionally used in an aramid fiber is dissolved only in a sulfuric acid solvent, there were problems such as device corrosion and deterioration of a working environment or the like due to the use of the sulfuric acid solvent.

In Kevlar-Based Nanocomposites with Hierarchical Structure, ECCM15-15$^{TH}$ EUROPEAN CONFERENCE ON COMPOSITE MATERIALS, Venice, Italy, 24-28 Jun. 2012, a method for preparing an aramid nanofiber solution by stirring a Kevlar fiber under KOH and a dimethyl sulfoxide (DMSO) solvent for 7 days to 9 days is described, but since processes of dissolving aromatic polyaramid (hereinafter, also referred to as aramid) in sulfuric acid, processing the solution into a fiber by a mechanical spinning process, and treating residual sulfuric acid are needed for preparing the Kevlar fiber as described above, there is an environmental burden. In addition, in order to dissolve the thus-prepared Kevlar fiber in a solvent again to prepare a nanofiber, a long time of a week or more is needed, and thus, the burden of preparation costs and preparation time is large, and it is not easy to perform the method industrially.

DISCLOSURE

Technical Problem

As a result of research solving the above problems, departing from a method of preparing an aramid nanofiber from aramid in the form of a fiber like Kevlar, the inventors of the present invention found that an aramid nanofiber is prepared from an aromatic polyamide-based polymer in the form of an amorphous solid which is not processed into a fiber form, thereby reducing a preparation time by twice or more as compared with a method for preparing a nanofiber from aramid in the form of fiber like Kevlar.

An object of the present invention is to provide a method for preparing an aramid nanofiber from an aromatic polyamide-based polymer in the form of an amorphous solid which is not processed into a fiber form.

Another object of the present invention is to provide a method of further accelerating preparation of an aramid nanofiber by performing polymerization using a specific solvent in the aromatic polyamide-based polymer preparation.

TECHNICAL SOLUTION

In one general aspect, a method for preparing an aramid nanofiber dispersion includes: dissolving or dispersing an aromatic polyamide-based polymer in a solution including a basic material and an aprotic polar solvent, while performing stirring so that a nanofiber is derived.

In another general aspect, an aramid nanofiber may be obtained by filtering the aramid nanofiber dispersion prepared by the preparation method, and may have an average diameter of 1 to 100 nm and an average length of 0.1 to 100 µm.

In another general aspect, a molded article may be prepared by including the aramid nanofiber or the aramid nanofiber dispersion as a reinforcement.

In still another general aspect, a porous substrate is prepared by applying or filtering and drying the aramid nanofiber dispersion prepared by the preparation method, and includes an aramid nanofiber having an average diameter of 1 to 100 nm and an average length of 0.1 to 100 µm.

Advantageous Effects

In the method for preparing an aramid nanofiber dispersion according to an exemplary embodiment of the present invention, the aramid nanofiber dispersion is prepared using an aromatic polyamide-based polymer, not a fibrous form such as Kevlar, thereby further reducing a preparation time as compared with a method using a fiber and not using a sulfuric acid as compared with a method for preparing a fiber using a sulfuric acid, and thus, an environmentally friendly preparation method may be provided.

In addition, the aramid nanofiber dispersion according to an exemplary embodiment of the present invention is prepared in a state in which an aramid nanofiber is dispersed in a solvent, and thus, may be produced into a porous substrate in a sheet form, and may be applied to various filters or separators using the same.

In addition, in the method for preparing an aramid nanofiber dispersion according to an exemplary embodiment of the present invention, in the preparation of the aromatic polyamide-based polymer, polymerization is performed using an aprotic polar solvent and the solvent is used as a cosolvent, thereby reducing the preparation time of the aramid nanofiber by twice or more.

In addition, since an aromatic polyamide-based polymer may be prepared from 2,5-furan dicarboxylic acid chloride which is a biomass-based 2,5-furan dicarboxylic acid derivative and a nanofiber may be prepared using the polymer, the present invention may contribute to development of environmentally friendly materials and may contribute to continuous growth.

BEST MODE

Hereinafter, the present invention will be described in more detail with reference to specific examples or exemplary embodiments including the accompanying drawings. However, the following specific examples or exemplary embodiments are only a reference for describing the present invention in detail, and the present invention is not limited thereto, and may be implemented in various forms.

In addition, unless otherwise defined, all technical terms and scientific terms have the same meanings as those commonly understood by a person skilled in the art to which the present invention pertains. The terms used herein are only for effectively describing a certain specific example, and are not intended to limit the present invention. In addition, the singular form used in the specification and claims appended thereto may be intended to also include a plural form, unless otherwise indicated in the context.

The term "aromatic polyamide-based polymer" in the present invention refers to a polymer in the form of an amorphous solid which is not processed into a fiber form, and is distinguished from a fiber oriented by spinning and stretching. That is, the polymer in the form of an amorphous solid may not be oriented. In addition, the fiber form refers to a fiber having 10 denier or more based on a single fiber, which is a minimum diameter where chain orientation occurs. That is, the polymer in the form of an amorphous solid of the present invention refers to a polymer which is not processed into a fiber form having 10 denier or less based on a single fiber.

In addition, the "aromatic polyamide-based polymer" may be a purified polymer from which an organic solvent and a by-product used as a reaction raw material in the preparation of the polymer are removed or a mixed composition from which the organic solvent and the by-product are not removed. The organic solvent included in the mixed composition may be used as a cosolvent in the preparation of the aramid nanofiber dispersion.

The term "nanofiber" in the present invention refers to a nanofiber having a diameter of several to several hundred meters, and is distinguished from the nanofiber prepared by electrospinning. More specifically, the nanofiber in the present invention has an average diameter of 1 to 100 nm and an average length of 0.1 to 100 μm, and is characterized in that the surface thereof is charged with a negative charge.

In the method for preparing an aramid nanofiber dispersion according to an embodiment, the nanofiber may be prepared while stirring until the aromatic polyamide-based polymer is completely dissolved or dispersed in a solution including a basic material and an aprotic polar solvent. More specifically, a step of dissolving or dispersing an aromatic polyamide-based polymer in a solution including a basic material and an aprotic polar solvent, while performing stirring so that a nanofiber may be derived, may be included.

In an embodiment of the preparation method, the stirring may be performed at a temperature of 50° C. or lower.

In an embodiment of the preparation method, a time that it takes for the aromatic polyamide-based polymer to be completely dissolved may be 80 hours or less.

In an embodiment of the preparation method, 0.01 to 5 parts by weight of the aromatic polyamide-based polymer and 0.01 to 5 parts by weight of the basic material may be used, based on 100 parts by weight of the aprotic polar solvent.

In an embodiment of the preparation method, the aprotic polar solvent may be any one or a mixed solvent of two or more selected from dimethyl sulfoxide (DMSO), N-methyl-2-pyrrolidone (NMP), N,N-dimethylacetamide (DMAc), hexamethylphosphoramide (HMPA), N,N,N',N'-tetramethyl urea (TMU), and N,N-dimethylformamide (DMF).

In an embodiment of the preparation method, the aramid nanofiber may have an average diameter of 1 to 100 nm and an average length of 0.1 to 100 μm.

In an embodiment of the preparation method, the aromatic polyamide-based polymer may be a para-type wholly aromatic polyamide-based polymer.

In an embodiment of the preparation method, the aromatic polyamide-based polymer may be a polymer in the form of a solid which is not spun into a fiber form.

In an embodiment of the preparation method, the aromatic polyamide-based polymer may be obtained by polymerizing a polymerization composition including an organic solvent, an aromatic diamine, and an n aromatic diacid-based compound, and then performing filtration and purification.

In an embodiment of the preparation method, the polymerization may be performed by, in a state of applying shear by stirring a polymerization composition (A) in which the aromatic diamine is dissolved in the organic solvent at a high speed, adding a polymerization composition (B) in which the aromatic diacid-based compound is dissolved in the organic solvent.

In an embodiment of the preparation method, the polymerization may be performed within 60 seconds.

In an embodiment of the preparation method, the polymerization composition may further include any one or two or more tertiary amine-based solvents selected from pyridine, picoline, quinoline, pyrimidine, pyrazine, quinoxaline, acrylidine, phenazine, triethylamine, t-butylamine, and N, N-dimethylaniline.

In an embodiment of the preparation method, the polymerization composition may further include any one or two or more inorganic salts selected from halogenated alkali metal salts and halogenated alkaline earth metal salts.

In an embodiment of the preparation method, the aromatic polyamide-based polymer may be a mixed composition which is not filtered and purified after polymerizing the polymerization composition including the aprotic polar solvent, the aromatic diamine, and the aromatic diacid-based compound, the mixed composition including the aprotic polar solvent and a by-product.

In an embodiment of the preparation method, the polymerization may be performed by, in a state of applying shear by stirring a polymerization composition (A) in which the aromatic diamine is dissolved in the aprotic polar solvent at a high speed, adding a polymerization composition (B) in which the aromatic diacid-based compound is dissolved in the aprotic polar solvent.

In an embodiment of the preparation method, the aprotic polar solvent used in the polymerization may be any one or a mixed solvent of two or more selected from N-methyl-2-pyrrolidone (NMP), N,N-dimethylacetamide (DMAc), hexamethylphosphoramide (HMPA), N,N,N',N'-tetramethyl urea (TMU), and N, N-dimethylformamide (DMF).

In an embodiment of the preparation method, the polymerization may be performed within 60 seconds.

In an embodiment of the preparation method, the polymerization composition may further include any one or two or more tertiary amine-based solvents selected from pyridine, picoline, quinoline, pyrimidine, pyrazine, quinoxaline, acrylidine, phenazine, triethylamine, t-butylamine, and N, N-dimethylaniline.

In an embodiment of the preparation method, the polymerization composition may further include any one or two or more inorganic salts selected from halogenated alkali metal salts and halogenated alkaline earth metal salts.

In an embodiment of the preparation method, a time that it takes for the aromatic polyamide copolymer to be completely dissolved may be 20 hours or less.

The aramid nanofiber according to an exemplary embodiment of the present invention may be obtained by filtering the aramid nanofiber dispersion prepared by the preparation method, and may have an average diameter of 1 to 100 nm and an average length of 0.1 to 100 µm.

The molded article according to an exemplary embodiment may include the aramid nanofiber as a reinforcement.

The molded article according to an exemplary embodiment may include the aramid nanofiber dispersion as a reinforcement.

The porous substrate according to an exemplary embodiment of the present invention may be prepared by applying or filtering and drying the aramid nanofiber dispersion prepared by the preparation method, and may include an aramid nanofiber having an average diameter of 1 to 100 nm and an average length of 0.1 to 100 µm.

The porous substrate according to an exemplary embodiment of the present invention may be included in a filter or a separator and at least one layer thereof may be included.

Hereinafter, the method for preparing an aramid nanofiber according to an embodiment of the present invention will be described in more detail.

The aramid nanofiber dispersion according to an embodiment of the present invention may produce a nanofiber while performing stirring until the aromatic polyamide-based polymer is completely dissolved or dispersed in a solution including a basic material and an aprotic polar solvent. Here, in the process of dissolving or dispersing, the nanofiber may be formed by self-assembly, and a sufficient time may be needed for producing a nanofiber. More specifically, the dispersion is completely dissolved until the aromatic polyamide-based polymer is not seen with the naked eye, and is produced into the nanofiber by self-assembly and dispersed in the solution. In addition, a time to allow self-assembly is imparted, but it is characterized in that the time is minimized. In addition, the term self-assembly is a term which comprehensively expresses a phenomenon in which the aromatic polyamide-based polymer forms the nanofiber by dissolution or dispersion in the solvent.

The aprotic polar solvent used for preparing the nanofiber by dissolving the aromatic polyamide-based polymer may be, specifically, for example, any one or a mixed solvent of two or more selected from dimethyl sulfoxide (DMSO), N-methyl-2-pyrrolidone (NMP), N,N-dimethylacetamide (DMAc), hexamethylphosphoramide (HMPA), N,N,N',N'-tetramethyl urea (TMU), N,N-dimethylformamide (DMF), and the like. More specifically, for example, dimethyl sulfoxide (DMSO) may be used alone, or dimethyl sulfoxide (DMSO) may be mixed with any one or two or more cosolvents selected from N-methyl-2-pyrrolidone (NMP), N,N-dimethylacetamide (DMAc), hexamethylphosphoramide (HMPA), N,N,N',N'-tetramethyl urea (TMU), N,N-dimethylformamide (DMF), and the like. By mixing and using the cosolvent, a time that it takes to prepare the nanofiber, that is, a time that it takes for the aromatic polyamide-based polymer to be dissolved until the polymer is not seen with the naked eye may be further reduced, as compared with the case of using dimethyl sulfoxide (DMSO) alone.

The basic material may be, specifically, for example, a strong base such as potassium hydroxide and sodium hydroxide, but is not limited thereto.

The basic material may be used at a stoichiometric amount to the aromatic polyamide-based polymer, and more specifically, for example, 0.01 to 5 parts by weight of the aromatic polyamide-based polymer and 0.01 to 5 parts by weight of the basic material may be used, based on 100 parts by weight of the aprotic polar solvent.

Stirring may be performed in order for the aromatic polyamide-based polymer to be dissolved better, and may be performed at a temperature of 50° C. or lower, more specifically at a temperature of 10 to 50° C., and still more specifically at a temperature of 20 to 30° C. In addition, the stirring may be performed under the atmosphere of an inert gas such as nitrogen or argon, but is not limited thereto. The stirring may be performed at 10-1000 rpm, specifically 50-800 rpm, and more specifically 100-500 rpm, but is not limited thereto.

The stirring may be performed until the aromatic polyamide-based polymer is completely dissolved in the solution including the basic material and the aprotic polar solvent and aromatic polyamide particles are not seen when confirmed by the naked eye. A time that it takes for the aromatic polyamide-based polymer to be completely dissolved to be produced into the nanofiber may be 80 hours or less. More specifically, the time may be 1 to 80 hours. It is seen therefrom that a preparation time is greatly reduced as compared with one week or more being required when a fiber prepared by spinning and stretching a polymer is used. In addition, when a cosolvent is mixed with dimethyl sulfoxide (DMSO) as the solvent, the preparation time is further reduced to 1 to 20 hours.

The aromatic polyamide-based polymer refers to a polymer in the form of a solid which is not spun into a fiber form. More specifically, the aromatic polyamide-based polymer may be an amorphous solid form which is not processed into a fiber form of 10 denier or less based on a single fiber.

More specifically, the aromatic polyamide-based polymer may be a polymer prepared by polymerizing a polymerization composition including an organic solvent, an aromatic diamine, and an aromatic diacid-based compound. In addition, the polymer may be a para-type wholly aromatic polyamide-based polymer.

Here, the aromatic polyamide-based polymer may be a mixed composition which is filtered and purified after polymerization or not filtered and purified after polymerization, the mixed composition including the aprotic polar solvent and a by-product.

An embodiment of the aromatic polyamide-based polymer may be obtained by polymerizing a polymerization composition including an organic aromatic diamine, and an aromatic diacid-based compound, and then performing filtration and purification.

The organic solvent is not limited as long as it may dissolve the aromatic diamine and the aromatic diacid-based compound, and specifically, for example, an aprotic polar solvent may be used, and for example, the organic solvent may be any one or a mixed solvent of two or more selected from N-methyl-2-pyrrolidone (NMP), N,N-dimethylacetamide (DMAc), hexamethylphosphoramide (HMPA), N,N,N',N'-tetramethyl urea (TMU), and N, N-dimethylformamide (DMF).

The aromatic diamine may be, for example, m-phenylenediamine, p-phenylenediamine, 2,5-diaminobenzotriazonitrile, chlorophenylenediamine, methyl phenylenediamine, acetyl phenylenediamine, amino anisidine, benzidine, bis(aminophenyl) ether, bis(aminophenyl) sulfone, diaminobenzanilide, diaminobenzene, and the like, and may be used alone or in combination of two or more.

The aromatic diacid-based compound may be terephthaloyl chloride, isophthaloyl chloride, 1,4-naphthalene dicarboxylic acid chloride, 2,6-naphthalene dicarboxylic acid chloride, 4,4'-biphenyl dicarboxylic acid chloride, 5-chloroisophthalic acid chloride, 5-methoxy isophthalic acid chloride, bis(chlorocarbonylphenyl) ether, and the like, and may be used alone or in combination of two or more.

The polymerization may be, specifically, for example, performed by, in a state of applying shear by stirring a polymerization composition (A) in which the aromatic diamine is dissolved in the organic solvent at a high speed, adding a polymerization composition (B) in which the aromatic diacid-based compound is dissolved in the organic solvent. An addition order of the polymerization composition (A) and the polymerization composition (B) is not limited, and may be added simultaneously and polymerized. That is, it is possible to add the polymerization composition (A) while stirring the polymerization composition (B) at a high speed.

The stirring at a high speed may be, specifically, for example, performed using a mixer such as a blender, and more specifically, for example, performed at 50-5000 rpm, and more specifically 200-4000 rpm. By performing polymerization in a state of applying shear by stirring at a high speed, the preparation time of polyamide may be further reduced, and the nanofiber may be prepared by a reaction of an alkali base and a dimethyl sulfoxide solvent without a separate fibrous process such as spinning, which is thus preferred.

In addition, by performing polymerization by stirring at a high speed as described above, the polymerization may be performed within a very short time, specifically within 60 seconds, specifically within 1 to 30 seconds, and more specifically within 1 to 20 seconds. More specifically, for example, in a state of applying shear by stirring the polymerization composition (A) at a high speed, the polymerization composition (B) may be added in two or more portions, and the polymerization may be completed by adding the polymerization composition in portions within 30 seconds.

The polymerization composition may further include any one selected from tertiary amine-based solvents and inorganic salts or a mixture thereof, if necessary, in addition to the organic solvent, the aromatic diamine, and the aromatic diacid-based compound described above.

The tertiary amine-based solvent is used as an additional cosolvent together with the aprotic polar solvent used as the organic solvent, and specifically, for example, any one or a mixed solvent of two or more selected from pyridine, picoline, quinoline, pyrimidine, pyrazine, quinoxaline, acrylidine, phenazine, triethylamine, t-butylamine, N,N-dimethylaniline, and the like, may be used, but is not limited thereto. A content of the tertiary amine-based solvent may be 0.1 to 20 parts by weight, and more specifically 1 to 10 parts by weight, based on 100 parts by weight of the aprotic polar solvent used as a polymerization solvent, but is not limited thereto.

The inorganic salt is added for increasing a polymerization degree of the aromatic polyamide-based polymer, and any one or two or more inorganic salts selected from halogenated alkali metal salts and halogenated alkaline earth metal salts may be used. More specifically, for example, any one or a mixture of two or more selected from $CaCl_2$), LiCl, NaCl, KCl, LiBr, KBr, and the like may be used, but is not limited thereto. A content of the inorganic salt may be 0.1 to 20 parts by weight, and more specifically 1 to 10 parts by weight, based on 100 parts by weight of the aprotic polar solvent used as the polymerization solvent, but is not limited thereto.

After preparing the aromatic polyamide-based polymer according to an embodiment, the aromatic polyamide-based polymer in a state of powder which is obtained by filtration and purification may be used. The filtration may be performed by a common method. Specifically, for example, additional stirring is performed in a state of adding a mixed solvent in which distilled water and alcohol such as methanol are mixed to a reactor, a precipitate is filtered, and washing is performed several times using a solvent such as distilled water and acetone to perform purification. Thereafter, vacuum drying, heat treatment, or the like is performed to obtain dried powder.

Otherwise, the aromatic polyamide-based polymer is prepared, and then is used as it is without filtration and purification. In this case, the aprotic polar solvent used as the reaction solvent in the preparation of the aromatic polyamide-based polymer is included, and the aprotic polar solvent may be used as a cosolvent later in the process of preparing the aramid nanofiber dispersion. In addition, an unreactant and a by-product as well as the solvent may be included as they are and used. As such, when using a mixed composition including the aprotic polar solvent and the by-product, a time that it takes to prepare the nanofiber may be further reduced as compared with the case of using a purified aromatic polyamide-based polymer. Specifically, the time may be 20 hours or less.

The preparation method according to an embodiment of the present invention described above may produce a dispersion in a state in which the aramid nanofiber is dispersed in the solvent. Therefore, the aramid nanofiber may be obtained by performing filtration from the dispersion. The nanofiber may have an average diameter of 1 to 100 nm and an average length of 0.1 to 100 μm.

The aramid nanofiber obtained by filtration and purification may be used as a reinforcement for reinforcing the physical properties such as strength of various polymer materials. Here, the content used as the reinforcement may be used as a content for obtaining the strength commonly required in the corresponding field, and thus, is not limited. In addition, the polymer material may also be applied to various materials, and thus, is not limited.

In addition, it is possible to use the dispersion as the reinforcement as it is without filtration. More specifically, the nanofiber dispersion is mixed with the polymer composition and then molded, thereby preparing a molded article. The molded article may be, for example, in the form of a film, a sheet, a fiber, and the like, but is not limited thereto.

In addition, the dispersion is applied as it is or filtered to produce a sheet form and then dried, thereby preparing a porous substrate in a nonwoven fabric-like form. Specifically, the dispersion is applied on a substrate such as a nonwoven fabric or a porous polymer film and dried to prepare a laminate in which at least one layer is laminated on the substrate. The laminate prepared as such may be used as a filter or a separator. The nonwoven fabric or the porous polymer film may be used without a particular limitations as long as it is a material which is commonly used as a filter, a separator, or the like.

Otherwise, the dispersion may be applied to a substrate such as glass or a polymer sheet and then dried to prepare a sheet, and then laminated on a substrate such as a nonwoven fabric or a porous polymer film.

Besides, a porous substrate in a sheet form may be prepared by various known methods, and thus, there is no limitation.

Hereinafter, the present invention will be described in more detail with reference to the Examples and Comparative Examples. However, the following Examples and Comparative Examples are only an example for describing the present invention in detail, and do not limit the present invention in any way.

Hereinafter, the physical properties were measured as follows:
1) Nanofiber preparation time (hr): a composition including a mixture of an aromatic polyamide, KOH, and dimethyl sulfoxide (DMSO) was stirred, while a time that it took for the aromatic polyamide to be completely dissolved so that the aromatic polyamide was not seen with the naked eye was measured. In addition, when the solution which was visually completely dissolved was observed by SEM, it was confirmed that a nanofiber was dispersed.
2) Nanofiber average size (nm): an intensity-based average particle size of an aramid nanofiber/dimethyl sulfoxide (DMSO) solution was measured using equipment of a particle size analyzer (dynamic light scattering) with a model name of Zetasizer Nano ZS90 (Malvern Instruments).
3) Tensile strength (MPa), elongation (%), and tensile toughness (MJ/m3): these were measured according to ASTM D638-Type V using equipment of Instron 5966. Measurement was performed in a load cell of 10 kN at a crosshead speed of 100 mm/min at 25° C. An average value of five measurements was obtained. A tensile toughness value is an integral value of a strength and elongation curve shown in a tensile test.
4) Inherent viscosity: it was measured by dissolving an aromatic polyamide in a sulfuric acid at a concentration of 0.5 g/dl and then performing measurement using a Ubbelohde viscometer (IIc, diameter of 1.36 mm). In the case of an aramid nanofiber, the aramid nanofiber was precipitated in a 0.1 M aqueous sulfuric acid solution, neutralized, then pulverized, filtered, washed, and dried, and then dissolved in a sulfuric acid at a concentration of 0.5 g/dl, and the measurement was performed.

Synthesis Example 1

5.84 g (54.0 mmol) of 1,4-phenylene diamine, 8.54 g (108 mmol) of pyridine, 8.79 g (79.2 mmol) of $CaCl_2$), and 160 g of N-methyl-2-pyrrolidone were added to a 500 ml round bottom flask, and dissolved at 2° C. under a nitrogen environment (Composition A). 10.96 g (54.0 mmol) of terephthaloyl chloride and 20 g of N-methyl-2-pyrrolidone were dissolved in a separate flask (Composition B). Composition A was transferred to a blender (Tafal BL311E, 500 W), the blender was operated at a stirring speed of 300 rpm, and Composition B was added every 10 seconds to synthesize an aromatic polyamide copolymer (hereinafter, referred to as APC). 700 ml of distilled water and 700 ml of methanol were mixed and further blended, and a precipitate was filtered, washed several times with distilled water and acetone, and then vacuum dried. Yield: 98%, inherent viscosity: 4.7 dL/g Example 1

0.2 g of APC prepared in Synthesis Example 1, 0.3 g of KOH, and 100 g of dimethyl sulfoxide were added to a round bottom flask, and stirring was performed at 100 rpm at 25° C. under a nitrogen environment. A time that it took for the polymer to be completely dissolved so that the polymer was not seen with the naked eye was measured as 60 hours.

Synthesis Example 2

The process was performed in the same manner as in Synthesis Example 1, except that N, N-dimethylacetamide was used instead of N-methyl-2-pyrrolidone. Yield: 98%, inherent viscosity: 4.5 dL/g Example 2

The process was performed in the same manner as in Example 1, except that APC prepared in Synthesis Example 2 was used instead of APC prepared in Synthesis Example 1. A time that it took for the polymer to be completely dissolved so that the polymer was not seen with the naked eye was measured as 60 hours.

Synthesis Example 3

The process was performed in the same manner as in Synthesis Example 1, except that a mixture of 2.92 g (27.0 mmol) of 1,4-phenylene diamine and 3.60 g (27.0 mmol) of 2,5-diaminobenzonitrile was used instead of 5.84 g of 1,4-phenylene diamine, and N, N-dimethylformamide was used instead of N-methyl-2-pyrrolidone. Yield: 98%, inherent viscosity: 4.5 dL/g Example 3

The process was performed in the same manner as in Example 1, except that APC prepared in Synthesis Example 3 was used instead of APC prepared in Synthesis Example 1. A time that it took for the polymer to be completely dissolved so that the polymer was not seen with the naked eye was measured as 50 hours.

Synthesis Example 4

The process was performed in the same manner as in Synthesis Example 1, except that 10.42 g (54.0 mmol) of 2,5-furandicarboxylic acid chloride was used instead of 10.96 g of terephthaloyl chloride. Yield: 97%, inherent viscosity: 4.7 dL/g Example 4

The process was performed in the same manner as in Example 1, except that APC prepared in Synthesis Example 4 was used instead of APC prepared in Synthesis Example 1. A time that it took for the polymer to be completely dissolved so that the polymer was not seen with the naked eye was measured as 50 hours.

Synthesis Example 5

5.84 g (54.0 mmol) of 1,4-phenylene diamine, 8.54 g (108 mol) of pyridine, and 160 g of N-methyl-2-pyrrolidone were added to a 500 ml round bottom flask, and dissolved at 2° C. under a nitrogen environment (Composition C). 10.96 g (54.0 mol) of terephthaloyl chloride and 20 g of N-methyl-2-pyrrolidone were dissolved in a separate flask (Composition B). Composition C was transferred to a blender (Tafal BL311E, 500 W), the blender was operated at a stirring speed of 300 rpm, and Composition B was added every 10 seconds to synthesize APC. An unpurified mixed composition including a solvent and a by-product was used.

For measuring a yield and an intrinsic viscosity, 700 ml of distilled water and 700 ml of methanol were mixed and further blended, and a precipitate was filtered, washed several times with distilled water and acetone, and then vacuum dried. Yield: 97%, inherent viscosity: 1.8 dL/g Example 5

3.32 g of an APC mixed composition (0.2 g of APC, 2.8 g of N-methyl-2-pyrrolidone, 0.14 g of pyridine-HCl) prepared in Synthesis Example 5 and 97.2 g of dimethyl sulfoxide were added to a round bottom flask, and stirring was performed at 100 rpm at 25° C. under a nitrogen environment. A time that it took for the polymer to be completely dissolved so that the polymer was not seen with the naked eye was measured as 20 hours.

Synthesis Example 6

The process was performed in the same manner as in Synthesis Example 5, except that N, N-dimethylacetamide was used instead of N-methyl-2-pyrrolidone. Yield: 97%, inherent viscosity: 1.7 dL/g Example 6

The process was performed in the same manner as in Example 5, except that the APC mixed composition prepared in Synthesis Example 6 was used instead of the APC mixed composition prepared in Synthesis Example 5. A time that it took for the polymer to be completely dissolved so that the polymer was not seen with the naked eye was measured as 20 hours.

Synthesis Example 7

The process was performed in the same manner as in Synthesis Example 5, except that a mixture of 2.92 g (27.0 mmol) of 1,4-phenylenediamine and 3.60 g (27.0 mmol) of 2,5-diaminobenzonitrile was used instead of 5.84 g of 1,4-phenylene diamine and N,N-dimethylformamide was used instead of N-methyl-2-pyrrolidone. Yield: 97%, inherent viscosity: 1.7 dL/g Example 7

The process was performed in the same manner as in Example 5, except that the APC mixed composition prepared in Synthesis Example 7 was used instead of the APC mixed composition prepared in Synthesis Example 5. A time that it took for the polymer to be completely dissolved so that the polymer was not seen with the naked eye was measured as 18 hours.

Synthesis Example 8

The process was performed in the same manner as in Synthesis Example 5, except that 10.42 g (54.0 mmol) of 2,5-furandicarboxylic acid chloride was used instead of 10.96 g of terephthaloyl chloride. Yield: 96%, inherent viscosity: 1.9 dL/g Example 8

The process was performed in the same manner as in Example 5, except that the APC mixed composition prepared in Synthesis Example 8 was used instead of the APC mixed composition prepared in Synthesis Example 5. A time that it took for the polymer to be completely dissolved so that the polymer was not seen with the naked eye was measured as 18 hours.

Synthesis Example 9

0.90 g (8.4 mmol) of 1,4-phenylene diamine, 1.33 g (17 mmol) of pyridine, and 90 g of N, N-dimethylacetamide were added to a 500 ml round bottom flask, and dissolved at 2° C. under a nitrogen environment (Composition D). 1.70 g (8.4 mmol) of terephthaloyl chloride and 10 g of N, N-dimethylacetamide were dissolved in a separate flask (Composition E). Composition D was transferred to a blender (Tafal BL311E, 500 W), the blender was operated at a stirring speed of 300 rpm, and Composition E was added every 10 seconds to synthesize APC. An unpurified mixed composition including a solvent and a by-product was used.

For measuring a yield and an intrinsic viscosity, 700 ml of distilled water and 700 ml of methanol were mixed and further blended, and a precipitate was filtered, washed several times with distilled water and acetone, and then vacuum dried. Yield: 95%, inherent viscosity: 0.7 dL/g Example 9

3.5 g (0.062 mol) of KOH and 900 g of dimethyl sulfoxide were added to an unpurified mixed composition subjected to the process of Synthesis Example 9, and stirring was performed at 100 rpm at 25° C. under a nitrogen environment. A time that it took for the polymer to be completely dissolved so that the polymer was not seen with the naked eye was measured as 12 hours.

Synthesis Example 10

The process was performed in the same manner as in Synthesis Example 1, except that the stirring speed was 100 rpm. Yield: 98%, inherent viscosity: 4.3 dL/g

Example 10

The process was performed in the same manner as in Example 1, except that APC prepared in Synthesis Example 10 was used instead of APC prepared in Synthesis Example 1. A time that it took for the polymer to be completely dissolved so that the polymer was not seen with the naked eye was measured as 52 hours.

Synthesis Example 11

The process was performed in the same manner as in Synthesis Example 1, except that the stirring speed was 500 rpm. Yield: 98%, inherent viscosity: 4.7 dL/g

Example 11

The process was performed in the same manner as in Example 1, except that APC prepared in Synthesis Example 11 was used instead of APC prepared in Synthesis Example 1. A time that it took for the polymer to be completely dissolved so that the polymer was not seen with the naked eye was measured as 75 hours.

Example 12

The process was performed in the same manner as in Example 1, except that 90 g of DMSO and 10 g of NMP were used instead of 100 g of DMSO. A time that it took for the polymer to be completely dissolved so that the polymer was not seen with the naked eye was measured as 40 hours.

Example 13

The process was performed in the same manner as in Example 1, except that 90 g of DMSO and 10 g of DMAc were used instead of 100 g of DMSO. A time that it took for the polymer to be completely dissolved so that the polymer was not seen with the naked eye was measured as 42 hours.

Example 14

The process was performed in the same manner as in Example 1, except that 90 g of DMSO and 10 g of DMF were used instead of 100 g of DMSO. A time that it took for the polymer to be completely dissolved so that the polymer was not seen with the naked eye was measured as 45 hours.

Example 15

The process was performed in the same manner as in Example 1, except that 70 g of DMSO and 30 g of NMP were used instead of 100 g of DMSO. A time that it took for the polymer to be completely dissolved so that the polymer was not seen with the naked eye was measured as 38 hours.

Comparative Example 1

0.2 g of Kevlar fiber, 0.3 g of KOH, and 100 g of DMSO were added to a round bottom flask, and stirring was performed at 100 rpm at a temperature of 25° C. A time that it took for the fiber to be completely dissolved so that the fiber was not seen with the naked eye was measured as 150 hours.

Hereinafter, abbreviations of Table 1 are as follows:
PPD: 1,4-phenylene diamine
CYPPD: 2,5-diaminobenzonitrile
TPC: terephthaloyl chloride
FDC: 2,5-furandicarboxylic acid chloride
NMP: N-methyl-2-pyrrolidone
DMAc: N, N-dimethylacetamide
DMF: N, N-dimethylformamide
DMSO: dimethyl sulfoxide
APC: aromatic polyamide copolymer

TABLE 1

| | Diamine monomer | Dihalo monomer | Polymerization solvent | APC purified or not | Stirring conditions (rpm) |
|---|---|---|---|---|---|
| Synthesis Example 1 | PPD | TPC | NMP | Purified | 300 |
| Synthesis Example 2 | PPD | TPC | DMAc | Purified | 300 |
| Synthesis Example 3 | PPD/CYPPD | TPC | DMF | Purified | 300 |
| Synthesis Example 4 | PPD | FDC | NMP | Purified | 300 |
| Synthesis Example 5 | PPD | TPC | NMP | Unpurified (including NMP and pyridine-HCl) | 300 |
| Synthesis Example 6 | PPD | TPC | DMAC | Unpurified (including DMAc and pyridine-HCl) | 300 |
| Synthesis Example 7 | PPD/CYPPD | TPC | DMF | Unpurified (including DMF and pyridine-HCl) | 300 |
| Synthesis Example 8 | PPD | FDC | NMP | Unpurified (including NMP and pyridine-HCl) | 300 |
| Synthesis Example 9 | PPD | TPC | DMAC | Unpurified (including DMAc and pyridine-HCl) | 300 |

TABLE 1-continued

|  | Diamine monomer | Dihalo monomer | Polymerization solvent | APC purified or not | Stirring conditions (rpm) |
|---|---|---|---|---|---|
| Synthesis Example 10 | PPD | TPC | NMP | Having a lower APC concentration than Synthesis Example 6 Purified | 100 |
| Synthesis Example 11 | PPD | TPC | NMP | Purified | 500 |

TABLE 2

|  | Type of APC | APC mixed composition | Aprotic polar solvent | Preparation time (hr) | Nanofiber average size (nm) |
|---|---|---|---|---|---|
| Example 1 | Synthesis Example 1 | — | DMSO | 60 | 243 |
| Example 2 | Synthesis Example 2 | — | DMSO | 60 | 250 |
| Example 3 | Synthesis Example 3 | — | DMSO | 50 | 235 |
| Example 4 | Synthesis Example 4 | — | DMSO | 50 | 265 |
| Example 5 | Synthesis Example 5 | Unpurified (including NMP and pyridine-HCl) | DMSO | 20 | 202 |
| Example 6 | Synthesis Example 6 | Unpurified (including DMAc and pyridine-HCl) | DMSO | 20 | 250 |
| Example 7 | Synthesis Example 7 | Unpurified (including DMF and pyridine-HCl) | DMSO | 18 | 248 |
| Example 8 | Synthesis Example 8 | Unpurified (including NMP and pyridine-HCl) | DMSO | 18 | 286 |
| Example 9 | Synthesis Example 9 | Unpurified (including DMAc and pyridine-HCl) | DMSO | 12 | 339 |
| Example 10 | Synthesis Example 10 | — | DMSO | 52 | 240 |
| Example 11 | Synthesis Example 11 | — | DMSO | 75 | 270 |
| Example 12 | Synthesis Example 1 | — | DMSO, NMP (9:1) | 40 | 220 |
| Example 13 | Synthesis Example 1 | — | DMSO, DMAc (9:1) | 42 | 260 |
| Example 14 | Synthesis Example 1 | — | DMSO, DMF (9:1) | 45 | 275 |
| Example 15 | Synthesis Example 1 | — | DMSO, NMP (7:3) | 38 | 228 |
| Comparative Example 1 | Kevlar | — | — | 150 | 255 |

As seen in Table 2, it was found that the preparation time of the nanofibers of Examples 1 to 15 was further reduced as compared with Comparative Example 1. In addition, as shown in Examples 5 to 9, it was found that when the aromatic polyamide-based polymer was prepared and produced as it is into a nanofiber without purification, the preparation time of the nanofibers was further reduced as compared with using the polymers purified in Examples 1 to 4. As seen in Examples 10 and 11, the nanofibers were produced well regardless of the stirring speed when preparing the aromatic polyamide. As seen in Examples 12 to 15, when using an additional cosolvent (NMP, DMAc, or the like) in addition to DMSO, the preparation time may be further reduced.

Example 16

The aramid nanofiber dispersion prepared in Example 1 was mixed with a thermoplastic polyurethane and a dimethyl sulfoxide solution, and then was into produced a nanocomposite film by a solvent casting method. As the thermoplastic polyurethane, 5575AP grade available from DONGSUNG CORPORATION which is ester-type polyol-based was used, and 5 g of the thermoplastic polyurethane was dissolved in 20 g of a dimethyl sulfoxide solvent. An aramid nanofiber dispersion (2 mg of aramid nanofiber/1 g of dispersion solution) was mixed with the solution, mechanical stirring was performed at room temperature for 4 hours, and then the solution was stored for 2 days or more. The concentration of the aramid nanofiber relative to the final thermoplastic polyurethane was 0.04 wt %. The thickness of the film prepared after evaporating the solvent by a solvent casting method was 0.4 mm.

The physical properties of the thus-prepared film were evaluated, and are shown in the following Table 3.

Example 17

A thermoplastic polyurethane composite material was prepared in the same manner as in Example 16, except that the aramid nanofiber obtained from Example 5 was used.

The physical properties of the thus-prepared composite material were evaluated, and are shown in the following Table 3.

Example 18

A thermoplastic polyurethane composite material was prepared in the same manner as in Example 16, except that the aramid nanofiber obtained from Example 9 was used.

The physical properties of the thus-prepared composite material were evaluated, and are shown in the following Table 3.

Comparative Example 2

A thermoplastic polyurethane composite material was prepared in the same manner as in Example 16, except that the aramid nanofiber obtained from Comparative Example 1 was used.

The physical properties of the thus-prepared composite material were evaluated, and are shown in the following Table 3.

Comparative Example 3

The thermoplastic polyurethane and the dimethyl sulfoxide solution were mixed in the same manner as in Example 16, without using the aramid nanofiber, and then a nanocomposite film was prepared by a solvent casting method. The physical properties of the thermoplastic polyurethane alone in which the aramid nanofiber was not used were measured and are shown in the following Table 3.

TABLE 3

| | Type of nanofiber | Tensile strength (MPa) | Elongation (%) | Tensile toughness (MJ/m$^3$) |
|---|---|---|---|---|
| Example 16 | Example 1 | 83.5 | 1160 | 297 |
| Example 17 | Example 5 | 76.6 | 1290 | 316 |
| Example 18 | Example 9 | 76.4 | 1130 | 268 |
| Comparative Example 2 | Comparative Example 1 | 84.0 | 1210 | 322 |
| Comparative Example 3 | Not added | 48.2 | 1140 | 210 |

As seen in Table 3, when comparing Comparative Example 1 with Examples 1, 5, and 9, it was found that a similar strength increase effect was shown. It was found therefrom that the aramid nanofiber which was conveniently prepared in a further shortened time as compared with Comparative Example 1 showed the same efficiency of a nanocomposite strength increase effect.

Figure 1:
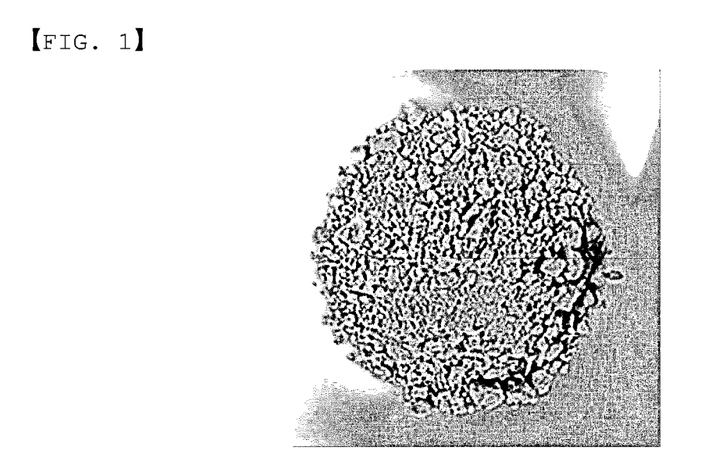
FIG. 1 is a photograph of a polymer which was subjected to a purification process after polymerizing aromatic polyamide as in Synthesis Example 1, as seen with the naked eye.
Figure 2:
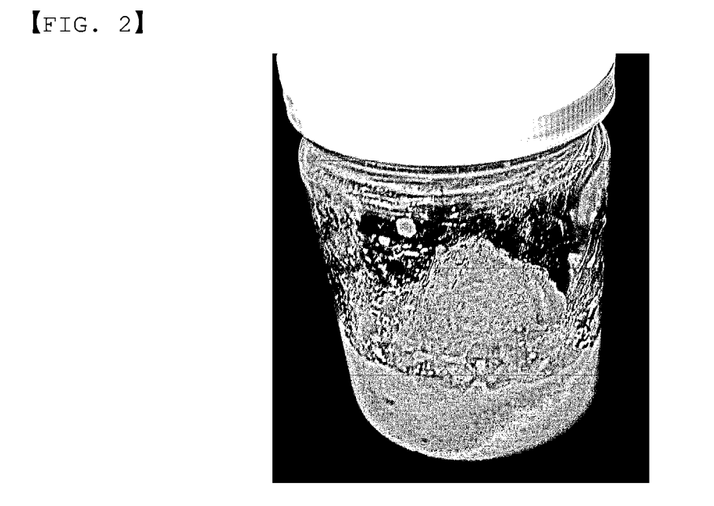
FIG. 2 is a photograph of a mixture which was not subjected to a purification process after polymerizing aromatic polyamide as in Synthesis Example 5, as seen with the naked eye.
Figure 3:
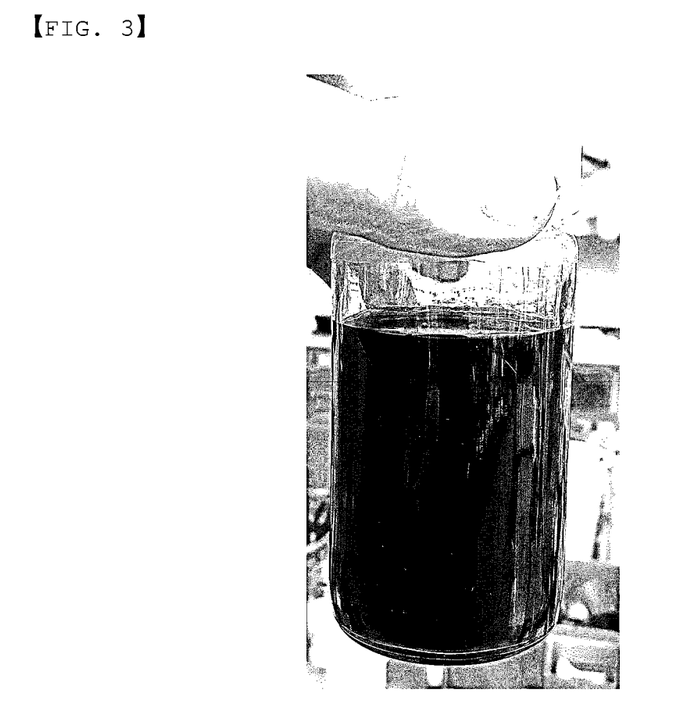
FIG. 3 is a photograph of an aramid nanofiber solution obtained in Example 1, as seen with the naked eye.
Figure 4:
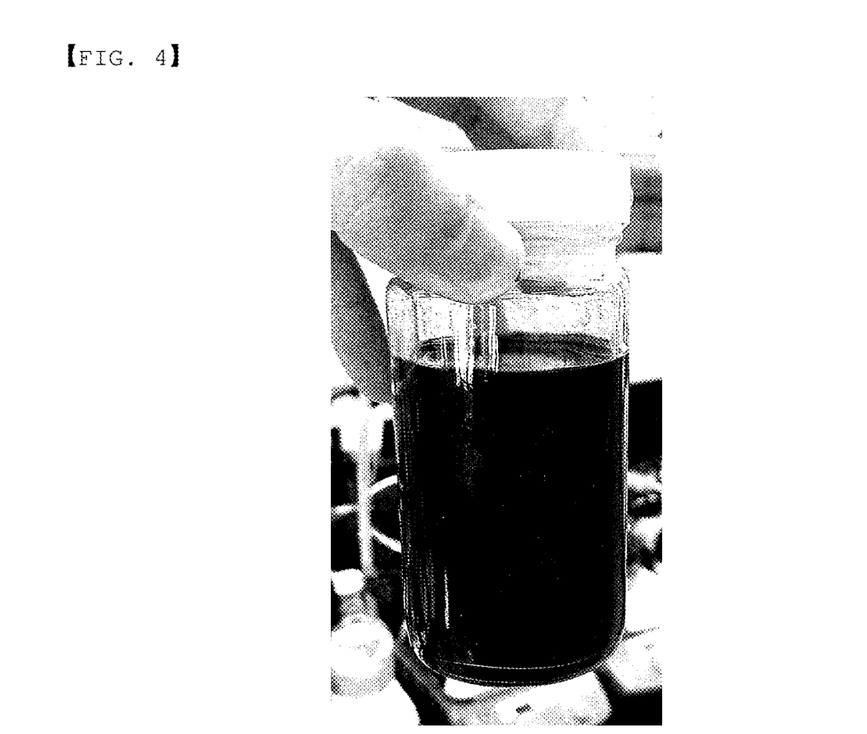
FIG. 4 is a photograph of an aramid nanofiber solution obtained in Example 5, as seen with the naked eye.
Figure 5:
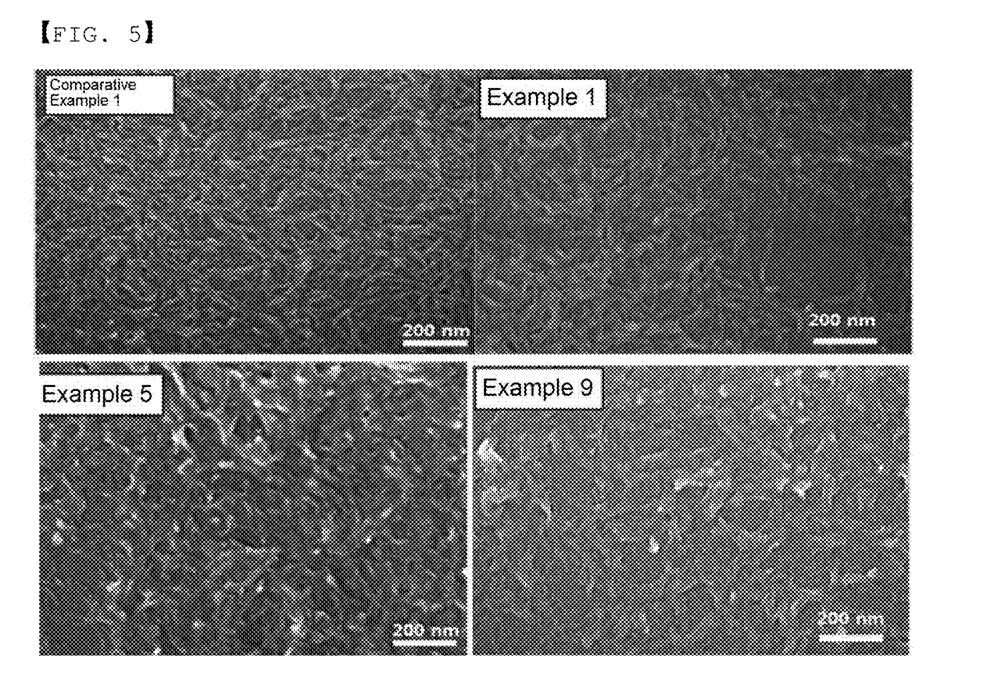
FIG. 5 is scanning electron microscope (SEM) photographs of aramid nanofibers obtained in Comparative Example 1 and Examples 1, 5, and 9.
Figure 6:
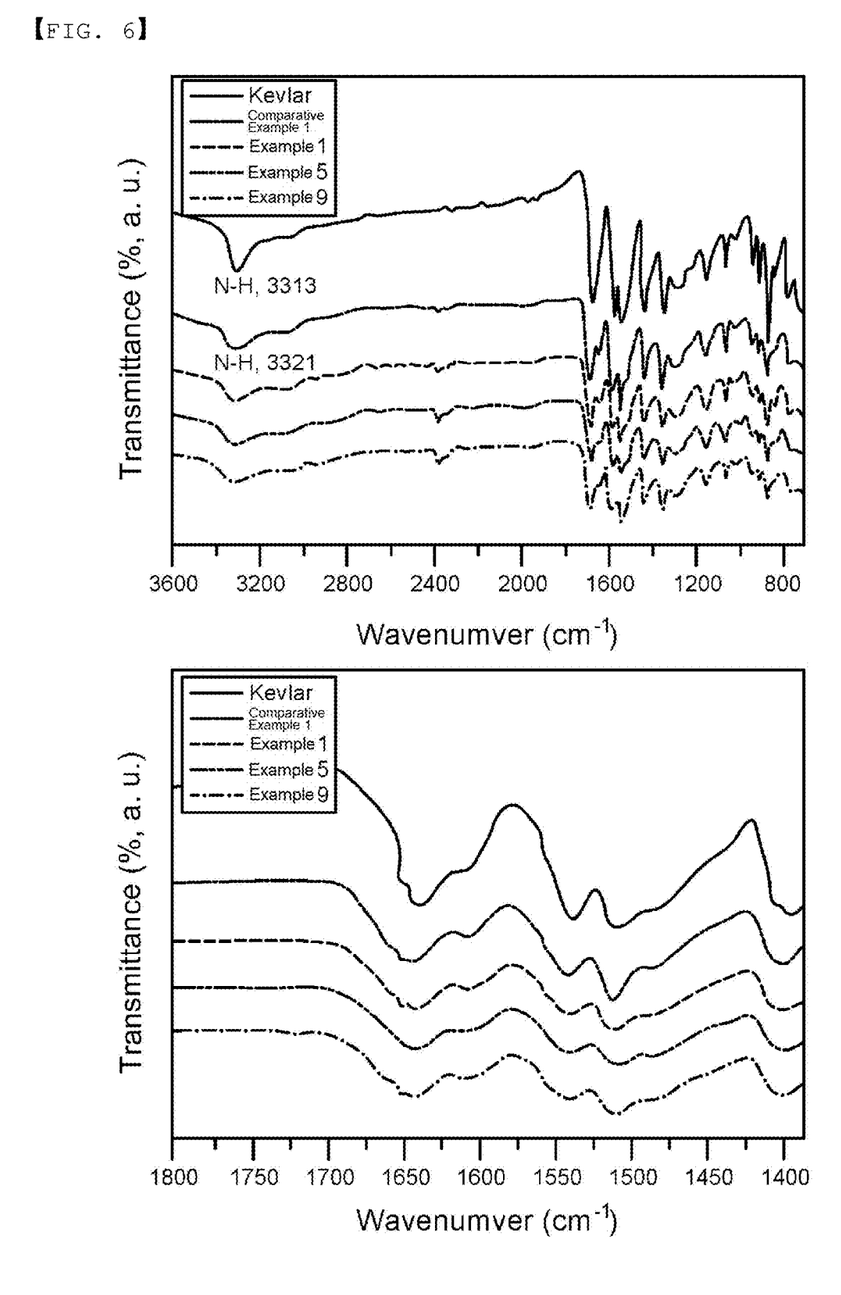
FIG. 6 is attenuated total reflectance Fourier transform infrared spectra (ATR-FTIR) photographs of aramid nanofibers obtained in Comparative Example 1 and Examples 1, 5, and 9.

In addition, it was found that the aramid nanofiber prepared according to the Examples of the present invention showed the same nanoform as the aramid fiber prepared according to Comparative Example 1, as seen in FIG. 5, and showed the same FT-IR structure, as seen in FIG. 6.

Figure 7:
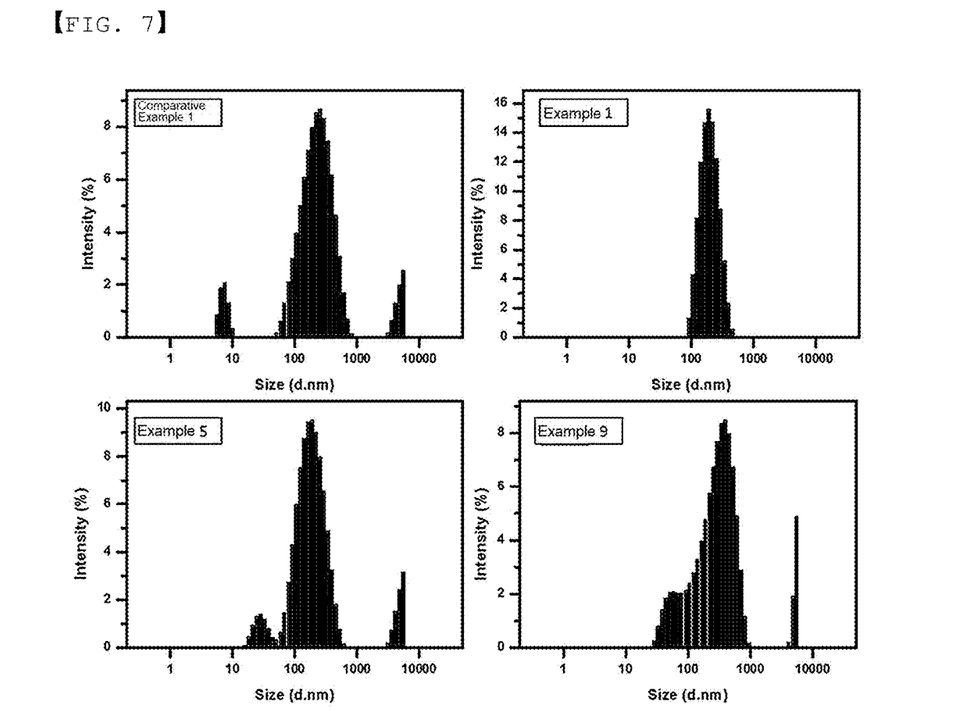
FIG. 7 is dynamic light scattering (DLS) graphs of aramid nanofibers obtained in Comparative Example 1 and Examples 1, 5, and 9.
Figure 8:
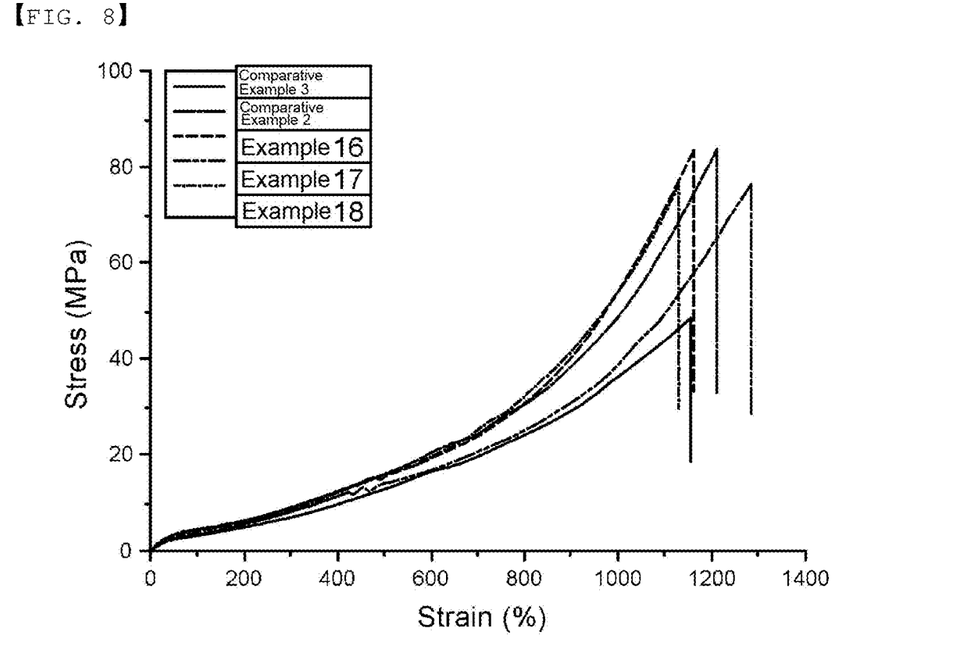
FIG. 8 is a tensile graph of thermoplastic polyurethane nanocomposite films obtained in Comparative Examples 2 and 3 and Examples 16 to 18.

In addition, as seen in FIG. 7, it was found that a similar nanoparticle distribution was shown.

Hereinabove, although the present invention has been described by specific matters, limited exemplary embodiments, and drawings, they have been provided only for assisting the entire understanding of the present invention, and the present invention is not limited to the exemplary embodiments, and various modifications and changes may be made by those skilled in the art to which the present invention pertains from the description.

Therefore, the spirit of the present invention should not be limited to the above-described exemplary embodiments, and the following claims as well as all modified equally or equivalently to the claims are intended to fall within the scope and spirit of the invention.

The invention claimed is:

1. A method for preparing an aramid nanofiber dispersion comprising:
dissolving an aromatic polyamide-based polymer in a solution including a basic material and an aprotic polar solvent, while performing stirring so that an aramid nanofiber is produced,
wherein the aromatic polyamide-based polymer is a polymer in a form of a solid which is not spun into a fiber form,
wherein the stirring is performed at a temperature of 50° C. or lower and at a speed of 10-1000 rpm so that a time taken for the aromatic polyamide-based polymer to be dissolved and formed into an aramid nanofiber dispersion is 80 hours or less, wherein an aramid nanofiber in the aramid nanofiber dispersion has an average diameter of 1 to 100 nm and an average length of 0.1 to 100 μm, and wherein the basic material includes potassium hydroxide or sodium hydroxide.

2. The method for preparing an aramid nanofiber dispersion of claim 1, wherein 0.01 to 5 parts by weight of the aromatic polyamide-based polymer and 0.01 to 5 parts by weight of the basic material are used, based on 100 parts by weight of the aprotic polar solvent.

3. The method for preparing an aramid nanofiber dispersion of claim 1, wherein the aprotic polar solvent is any one or a mixed solvent of two or more selected from dimethyl sulfoxide, N-methyl-2-pyrrolidone, N,N-dimethylacetamide, hexamethylphosphoramide, N,N,N',N'-tetramethyl urea, and N,N-dimethylformamide.

4. The method for preparing an aramid nanofiber dispersion of claim 1, wherein the aromatic polyamide-based polymer is a para-type wholly aromatic polyamide-based polymer.

* * * * *